United States Patent [19]

Shin-Chin

[11] Patent Number: 4,799,858
[45] Date of Patent: Jan. 24, 1989

[54] CLIP-ON ELECTRIC FAN

[75] Inventor: Shao Shin-Chin, San-Chung, Taiwan

[73] Assignee: Holmes Products Corp., Holliston, Mass.

[21] Appl. No.: 864,512

[22] Filed: May 19, 1986

[51] Int. Cl.$^4$ ............................................. F04D 29/60
[52] U.S. Cl. ..................................... 416/110; 416/246; 248/231.5
[58] Field of Search ...................... 416/100.62, 110.63, 416/246, 247 R; 415/129; 74/405, 426; 248/231.5, 231.8, 207; 200/296; 417/423 A, 234

[56] References Cited

U.S. PATENT DOCUMENTS

| | | | |
|---|---|---|---|
| 1,648,125 | 11/1927 | Horne | 248/231.5 |
| 2,123,448 | 7/1938 | Weber | 416/247 X |
| 2,417,303 | 3/1947 | Jordan | 416/100 X |
| 2,466,402 | 4/1949 | Falk | 200/296 X |
| 2,510,181 | 6/1950 | Jury | 248/231.5 X |
| 2,664,242 | 12/1953 | Sebastian | 416/246 |
| 2,725,184 | 1/1955 | Mucci | 416/110 X |
| 2,764,655 | 9/1956 | Schwartz | 200/296 |
| 2,794,591 | 6/1957 | Rodriguez | 416/110 X |
| 4,227,238 | 10/1980 | Saito | 200/296 X |

FOREIGN PATENT DOCUMENTS 1031687  6/1953  France ............................ 416/246

*Primary Examiner*—Robert E. Garrett
*Assistant Examiner*—Joseph M. Pitko
*Attorney, Agent, or Firm*—Irving M. Kriegsman

[57] ABSTRACT

A portable electric fan having a base in the form of a large clip, a yoke assembly which is mounted on said base for tilting movement back and forth about a horizontal axis and rotational movement about a vertical axis and a fan unit mounted on the yoke assembly, the fan unit including a motor actuating switch mounted outside of a motor housing is disclosed. The clip type base enables the fan to be easily attached to the side edge of a desk or table top or arm of a chair or the like while the location and mounting arrangement for the motor actuating switch enables the fan unit to be easily assembled.

10 Claims, 5 Drawing Sheets

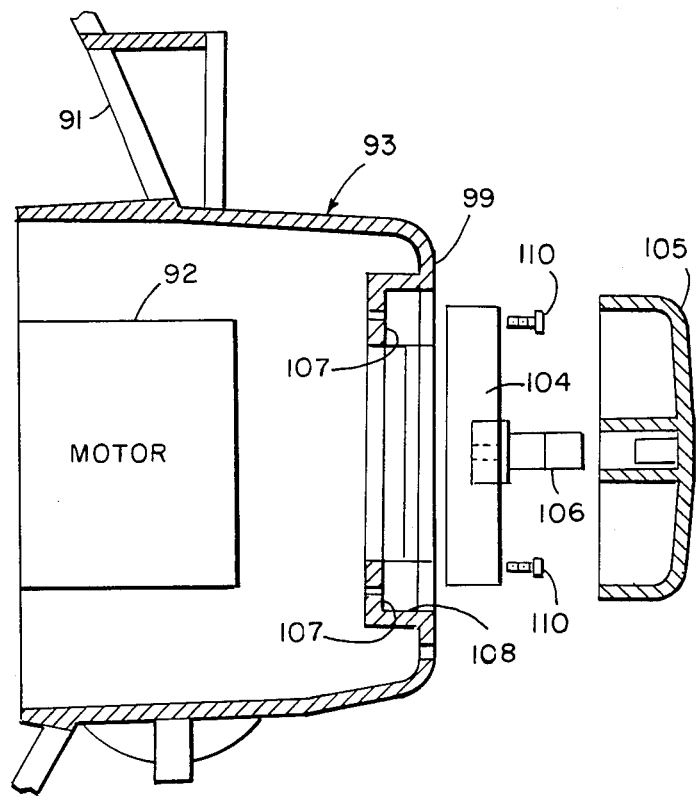
FIG. 8
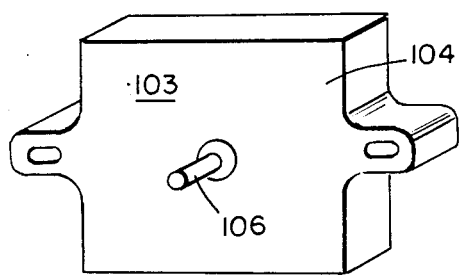
FIG. 9
FIG. 10

CLIP-ON ELECTRIC FAN

BACKGROUND OF THE INVENTION

The present invention relates generally to portable electric fans and more particularly to a portable electric fan which is constructed so that it can be clipped on to the side edge of a table top or desk top or the arm of a chair or the like.

Portable electric fans are well known in the art and commonly used to circulate air. Examples of portable electric fans may be found in U.S. Pat. No. 2,341,220, U.S. Pat. No. 2,725,184 and U.S. Pat. No. 2,811,304. These fans generally include a fan unit which is mounted either directly or through some type of joint on a base or pedestal for tilting movement backward and forward about a horizontal axis and/or for oscillating or rotational movement about a vertical axis. The tilting movement in a forward direction is usually limited to about 20 degrees downward beyond the horizontal since any further tilting will probably cause the fan to topple over due to its center of gravity. The fan unit usually includes a motor inside a motor housing for driving the fan blades and a motor actuating switch for actuating the motor.

The base or pedestal in these fans is constructed so that the fan can be placed or seated on a flat surface such as the top surface of a table or desk or counter. The problem with this type of construction is that the fan simply rests on the top surface on which it is placed and is not secured thereto in any way. In addition when resting on the top surface the fan takes up space which the user may need or desire for some other purpose. Also, in some cases there may not be a flat surface available that can accommodate the fan.

In the past the motor actuating switch has been either mounted inside the housing with the stem of the switch extending out of the housing through a small opening or mounted inside the base with the stem or button portion of the switch extending out through a small opening on the base. The problem with this mounting arrangement is that the components that make up the fan cannot be very easily assembled and once assembled cannot be very easily disassembled, especially to access the switch for repair or replacement.

The present invention solves the aforementioned problems by providing a fan which contains an integrally formed clip mechanism so that it can be clipped on to the side edge of a table top or desk top or arm of a chair or other similar structure and which is constructed so that the fan unit motor actuating switch is mounted on the housing for easy assembly. The invention achieves the above by providing a fan including a base in the form of a large clip and a fan in which the motor actuating switch is attached to the housing from the outside as opposed to from the inside of the housing. In use, the fan is simply clipped onto the appropriate structure and once clipped on is temporarily and securely fixed in place.

Accordingly, it is an object of the invention to provide a new and improved electric fan.

It is another object of this invention to provide a new and improved portable electric fan.

It is a further object of this invention to provide a portable electric fan which can be easily assembled.

It is still a further object of this invention to provide a portable electric fan which can be easily and temporarily attached to the side edge of a table top or desk top or arm of a chair or the like.

It is still a further object of this invention to provide a portable electric fan as described above which can be tilted back and forth about a horizontal axis and rotated about a vertical axis.

SUMMARY OF THE INVENTION

A portable electric fan constructed according to the teachings of the present invention includes a base in the form of a clip, a yoke assembly mounted on said clip for tilting movement back and forth about a horizontal axis and rotational movement about a vertical axis, and a fan unit mounted on said yoke assembly, said fan unit including a motor housing and a motor actuating switch mounted attached to said motor housing from the outside.

The foregoing and other objects and advantages will appear from the description to follow. In the description, reference is made to the accompanying drawings which form a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts;

FIG. 8 is an exploded view partly in section of the motor housing back of the safety guard and switch assembly of the fan shown in FIG. 1;

FIG. 9 is a perspective view of the switch shown in FIG. 8;

FIG. 10 is a section view of the portion of the fan unit of the fan shown in FIG. 7, but assembled.

DETAILED DESCRIPTION OF PREFERRED EMBODIMENTS

Figure 2:
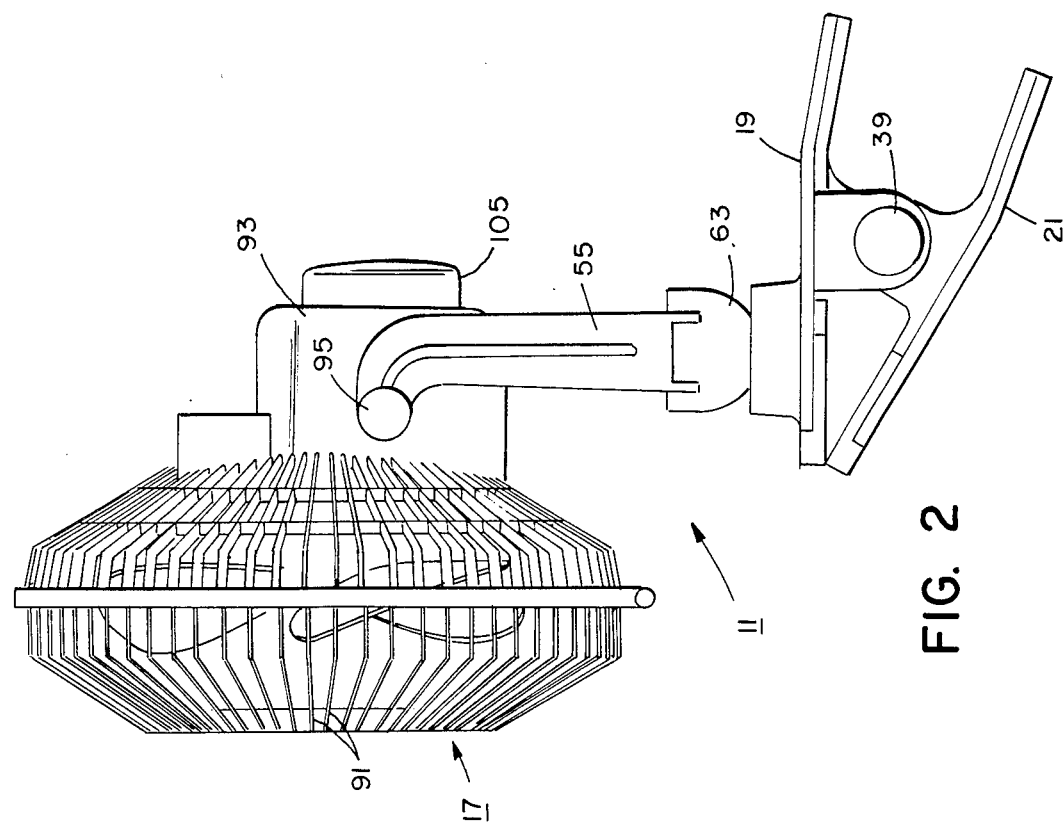
FIG. 2 is a side elevation view of the fan shown in FIG. 1.
Figure 1:
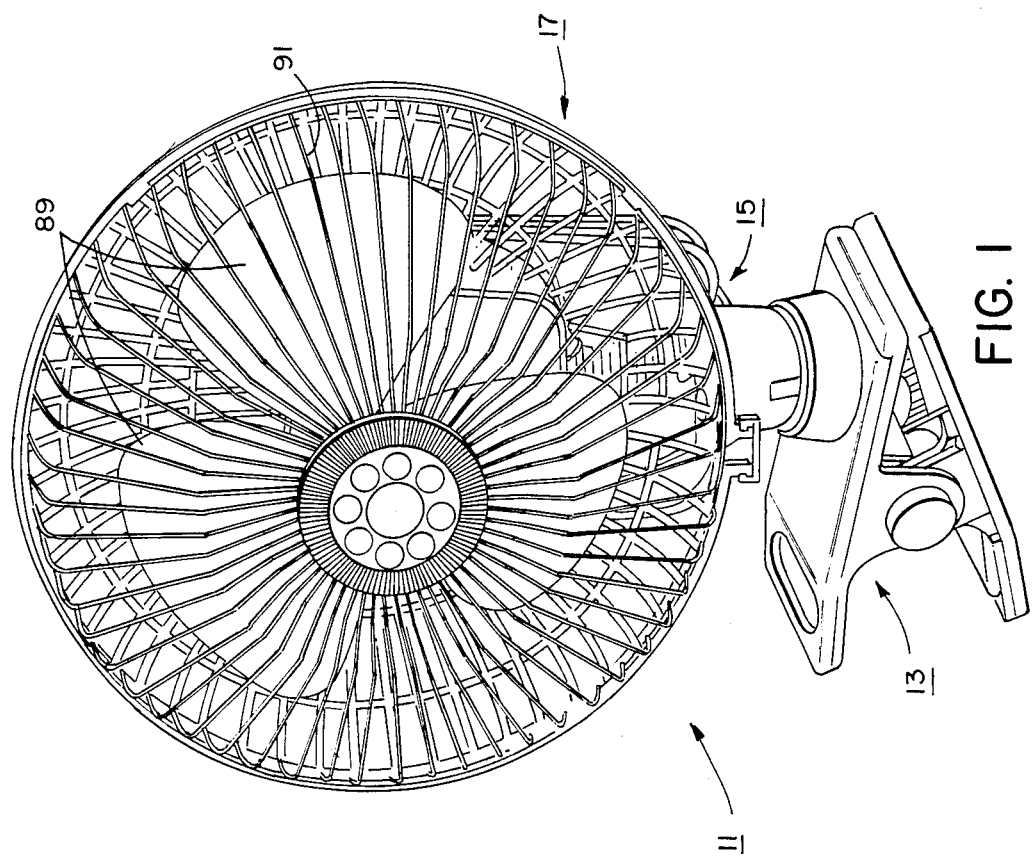
FIG. 1 is a perspective view taken from the front of a portable electric fan constructed according to the teachings of the present invention.
Figure 4:
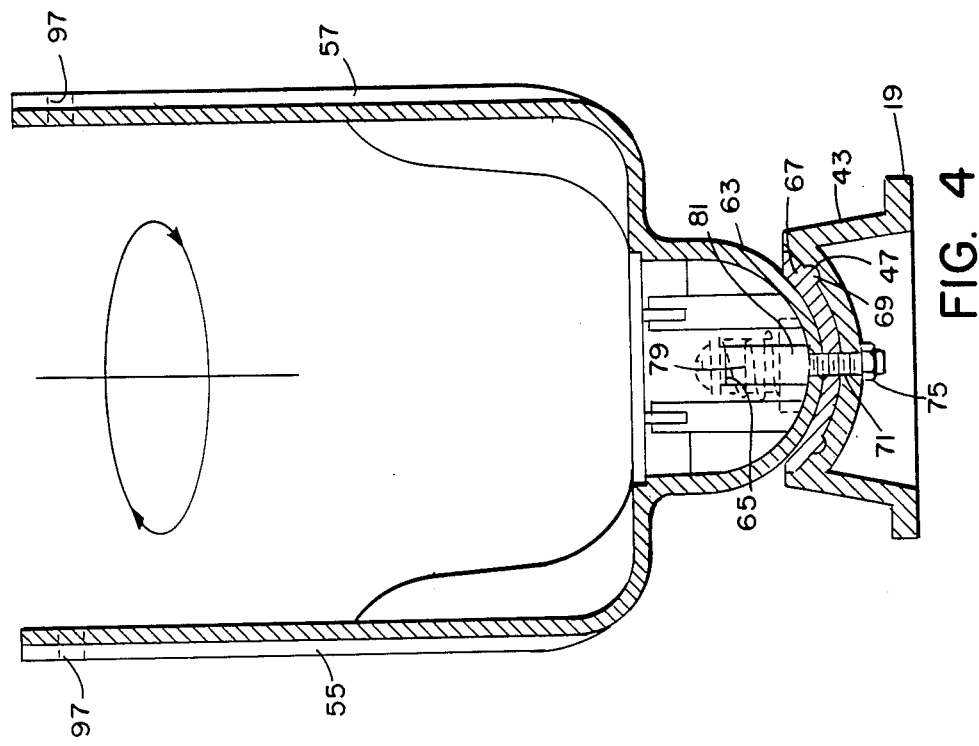
FIGS. 4 and 5 are views partly in section taken from front and side respectively, of the central portion of the fan shown in FIG. 1.
Figure 3:
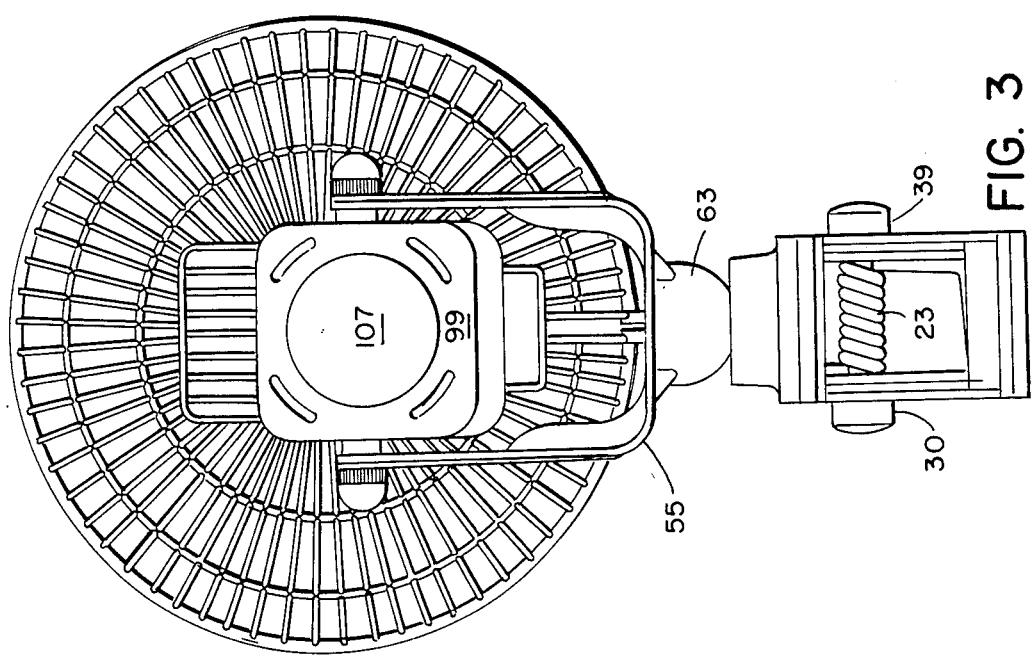
FIG. 3 is a back elevation view of the fan shown in FIG. 1.
Figure 7:
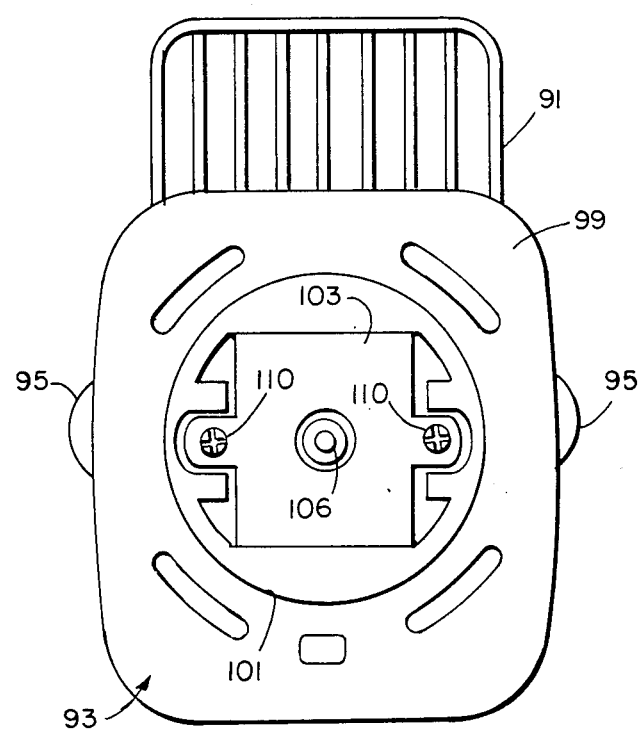
FIG. 7 is a back elevation view of the fan motor housing and switch in the fan unit shown in FIG. 1 with the motor switch cover removed.
Figure 5:
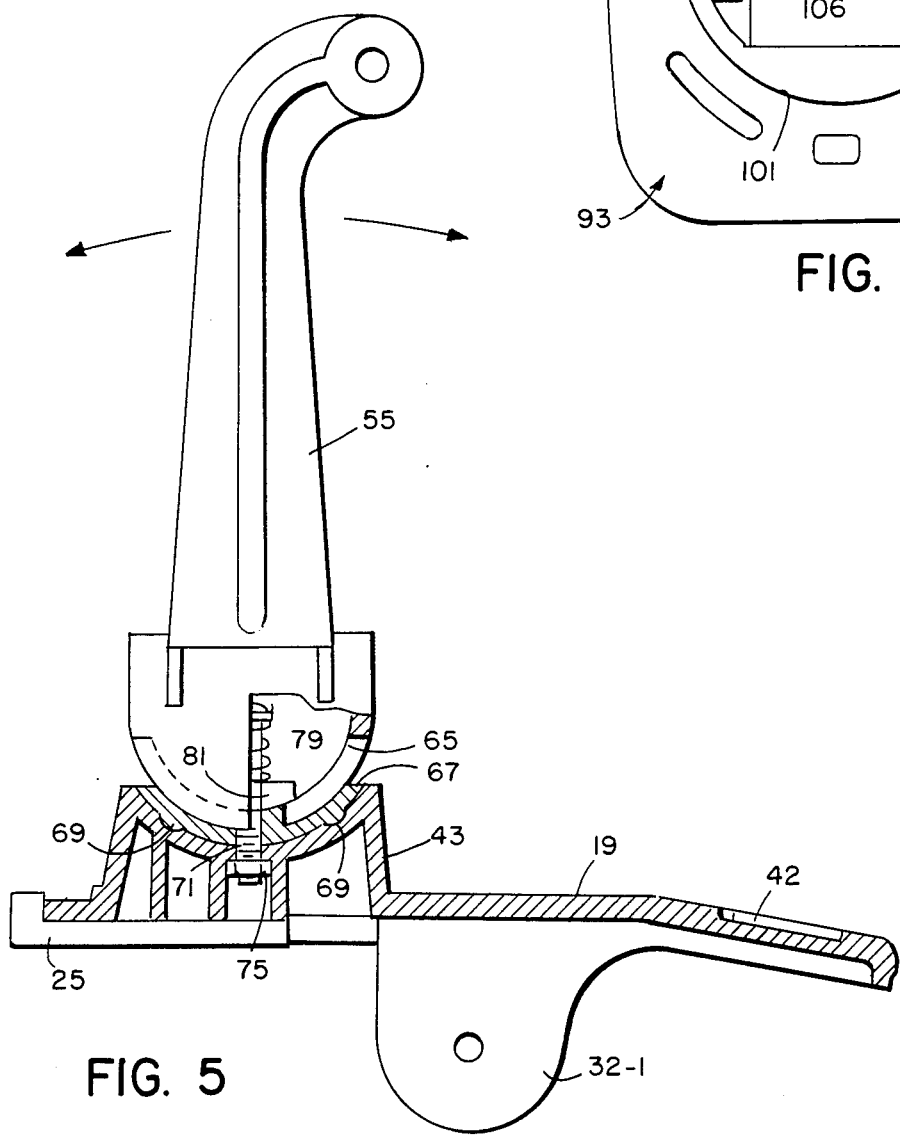
Figure 6:
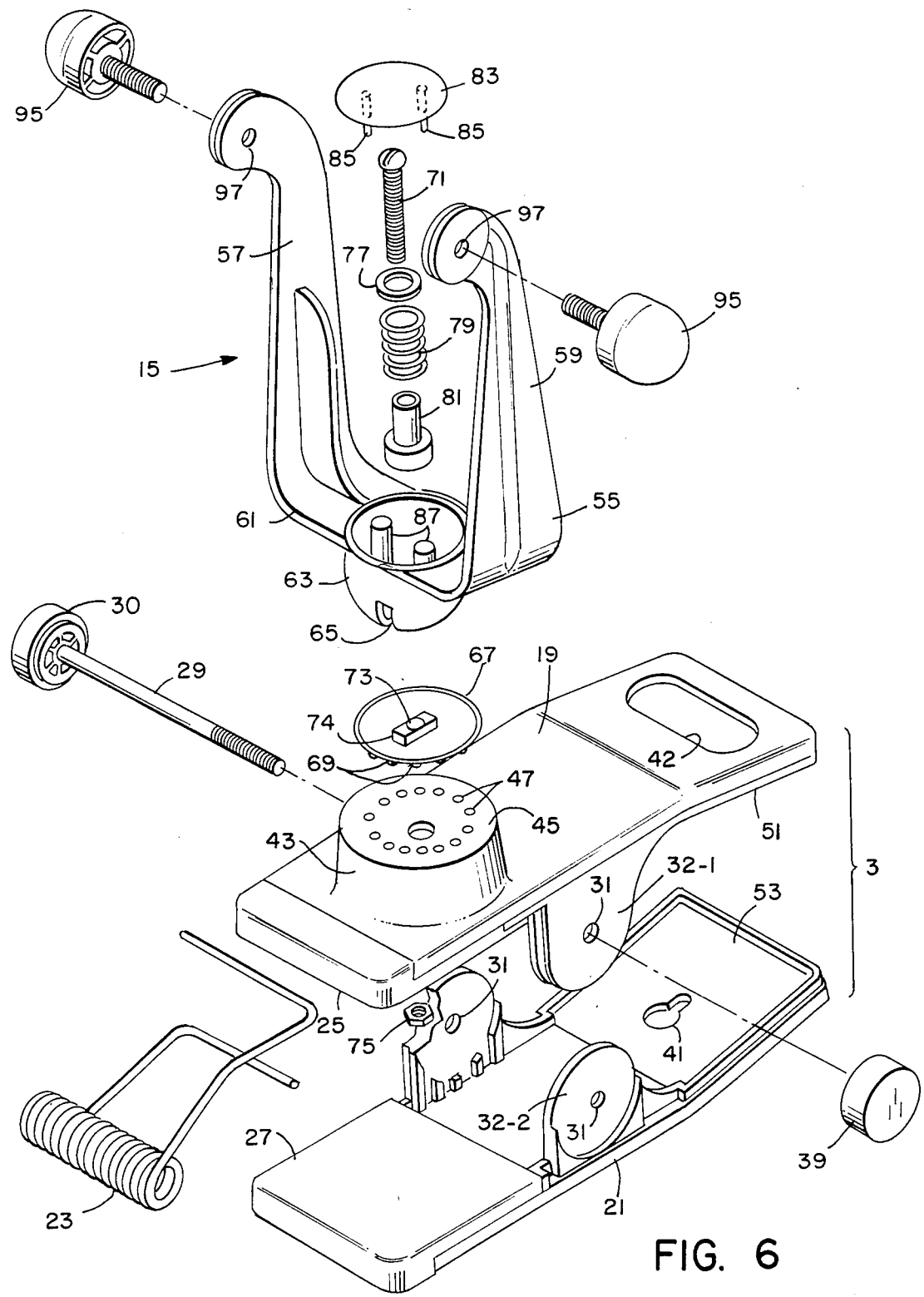
FIG. 6 is an exploded perspective view of the base and connecting joint portions of the fan shown in FIG. 1.

Referring now to the drawings, there is illustrated a portable electric fan constructed according to the teachings of the present invention and identified generally by reference numeral 11. For simplicity, the power cord for connecting fan 11 to a source of electrical power has been eliminated.

Fan 11 includes a base assembly 13, a yoke assembly 15 and a fan unit 7. Yoke assembly 15 is movably mounted on base assembly 13 and fan unit 17 is fixedly mounted on yoke assembly 15.

Base assembly 13 is in the form of a large clip and includes an elongated generally rectangular upper plate member 19, an elongated generally rectangular lower plate member 21 and a high tension coil spring 23. Upper and lower plate members 19 and 21 are made of plastic or other suitable material. Coil spring 23 is made of metal. A pair of rubber pads 25 and 27 are secured by glue or cement to the gripping ends of members 19 and 21, respectively, so that when clip 13 is attached to an object it will securely clamp onto it and will not scratch or otherwise damage it. Member 21 and member 23 are pivotally connected to each other by a partially threaded rod 29 having a cap 30 fixedly secured to its unthreaded end and which extends through holes 31 formed in ears 32-1 and 32-2 in side projections 33, 35 and 37 in members 19 and 21 and through the coil spring 23. Rod 29 is secured thereto by an internally threaded cap 39. A key shaped hole 41 is formed in member 21 so that fan 11 can be mounted on a hook of rail when it is not being used. Member 19 includes a recess 42 for gripping purposes and an upwardly extending boss 43 which has a concave top surface 45. The top surface 45 includes a plurality of dimples 47 which are arranged in a circle and a circular hole 49 in the center.

Clip 13 is sized to support fan unit 13 and functions in a manner similar to any clip of the type made up of two members pivotally interconnected and a coil spring. The gripping ends of members 19 and 21 (i.e. the ends containing the rubber pads 25 and 27) are normally urged toward each other because of the action of coil spring 23. The gripping ends are opened by squeezing the other ends 51 and 53 toward each other.

Yoke assembly 15 is mounted on clip 13 for tilting movement about a horizontal axis and rotational movement about a vertical axis. Yoke assembly 15 includes a yoke 55 made of plastic having a pair of legs 57 and 59 and a connecting section 61. Connecting section 61 includes a cup shaped joint 63 which has an elongated slot 65. Yoke assembly 15 also includes a concave stepping disc 67 made of plastic which contains a plurality of circular projections 69 arranged in a circle about the center. Stepping disc 67 is disposed on top of boss 43 and joint 63 is disposed on top of stepping disc 67.

Yoke 55 is secured to clip 13 by means of a bolt 71 which extends through slot 65 in joint 63 through a hole 73 formed in a raised portion 74 in the center of stepping disc 67 and through hole 49 formed in boss 45. Bolt 45 is secured in place by a nut 75. The connecting hardware also includes a washer 77, a coil spring 79 and a retaining sleeve 81. Because of the coil spring 79, yoke 55 although fixedly secured to boss 45, upon the application of sufficient force be tilted back and forth (through the length of slot 65) and also rotated about its vertical axis. Projections 69 in disc 67 cooperate with dimples 47 in boss 43 to enable yoke 55 to move in a stepping fashion. A disk shaped cover plate 83 made of plastic is mounted on the top of joint 63 and secured thereto by means of a pair of projections 85 which extend into openings formed in projections 87 in joint 63 in a friction type fit.

Fan unit 17 includes a set of fan blades 89 mounted on an axle (not shown) and enclosed within a safety guard 91. The fan blade axle is connected to the drive shaft of a motor 92 which is enclosed within a motor housing 93.

Fan unit is mounted on legs 57 and 59 of yoke 55 and is fixedly secured thereto by a pair of threaded capped rods 95 which extend through holes 97 formed in legs 57 and 59 and into a pair of internally threaded holes (not shown) formed in motor housing 93.

Motor housing 92 is boxed shaped and includes a back wall 99 having an opening 101. A switch 103 for turning the fan motor on and off is mounted on back wall 99 from the outside. Switch 103 includes a body portion 104, a cap 105 and a stem 106. Body portion 104 is mounted on a pair of seats 107 formed in an opening 108 in back wall 99 of motor housing 93 and is secured thereto by screws 110. Stem 106 extends out from body portion 104. Cap 105 is mounted on stem 106 and is sized so as to completely cover body portion 104 and thereby prevent exposure thereof. Seats 105 are formed in back wall 99 and are secured thereto by screws 106. A cap 107 is mounted on stem 109 of switch 103. Since switch 103 is not mounted on the housing from the inside but, rather is attached to it from the outside and exposed, cap 107 is sized so as to completely cover switch 103.

As can be seen, since switch 103 is mounted on housing 93 from the back and is not mounted inside housing 93, it can be easily installed and once installed can be easily accessed for repair or replacement without having to open up to take apart housing 93.

As can be appreciated, the invention is not limited to any particular fan unit.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A portable electric fan comprising:
   a. a base assembly
   b. a yoke assembly movably mounted on the base assembly, and
   c. a fan unit mounted on the yoke assembly,
   d. the base assembly including a member having a concave top surface, the concave top surface having a plurality of dimples arranged in a circle,
   e. the yoke assembly including a yoke and a concave stepping disc, the yoke including a cup shaped joint having an elongated slot, the concave stepping disc having a bottom surface having a plurality of circular projections arranged in a circle and a top surface having a raised portion, the concave stepping disc being disposed between the cup shaped joint and the concave top surface of the assembly base with the raised portion of the concave stepping disc being slidably movable from one end to the other in the elongated slot, the circle of projections on the stepping disc being aligned with the circle of dimples on the concave top surface.
   g. whereby, the raised portion in the stepping disc moving in the elongated slot in the cup shaped joint enables the yoke assembly to be tilted back and forth relative to the base and the projections in the disk and the dimples in the boss enable the yoke assembly to be rotated relative to the base assembly in a stepping fashion.

2. The portable electric fan of claim 1 and wherein the base assembly comprises a clip.

3. The portable electric fan of claim 2 and wherein the fan unit includes a motor housing, a motor in the housing, a set of fan blades in front of the housing and operatively connected to the motor and a motor actuating switch mounted on the housing from the outside and operatively connected to the motor.

4. The portable electric fan of claim 3 and wherein the switch includes a stem and a cover for the stem, the cover being sized to completely cover the switch.

5. A fan unit for an electric fan comprising:
   a. a motor housing,
   b. a motor mounted in the housing,
   c. a set of fan blades operatively connected to the motor, and
   d. a switch mounted on the housing from the outside and operatively connected to the motor for actuating the motor wherein the switch includes a body portion, a stem and a cap, the stem extending out from the body portion, the cap being mounted on the stem, the cap being sized to cover the body portion of the switch to prevent exposure thereof.

6. The fan unit of claim 5 and wherein the motor housing includes a wall having an opening and wherein the switch is mounted in the opening.

7. The fan unit of claim 6 and wherein the opening of the motor housing is shaped to include seat portions and the body portion of the switch is mounted on the seat portions.

8. The fan unit of claim 7 and wherein the seat portions are internally recessed in the motor housing.

9. A portable electric fan comprising:
   a. a clip adapted to clip onto a table top, desk top, arm of a chair or the like, the clip including an upper plate member having an upwardly extending boss, the boss having a concave top surface having a plurality of dimples arranged in a circle.
   b. a concave stepping disc disposed on top of the boss, the concave stepping disc having a plurality of circular projections on its bottom surface arranged in a circle and a raised portion on its top surface.
   c. a yoke disposed on top of the stepping disc, the yoke having a cup shaped joint having an elongated slot, the cup shaped joint resting on the stepping disc with the raised portion of the stepping disc in the elongated slot,
   d. a fan unit fixedly mounted on the yoke, and
   e. spring biased means for securing the yoke to the clip through the stepping disc,
   f. whereby the fan unit can tilt back and forth relative to the clip and rotate about the clip in a stepping fashion.

10. A fan unit for an electric fan comprising:
    a. a motor housing, said motor housing having a pair of seat portions,
    b. a motor mounted in the housing,
    c. a set of fan blades operatively connected to the motor, and
    d. a switch operatively connected to the motor for actuating the motor, the switch having a body portion, a stem extending out from the body portion and a cap, the body portion being mounted on the pair of seat portions of the housing of the motor from the outside the cap being mounted on the stem and being sized to cover the body portion so as to prevent exposure thereof.

* * * * *